(12) United States Patent
Choi et al.

(10) Patent No.: US 7,314,683 B2
(45) Date of Patent: Jan. 1, 2008

(54) CARBON COMPOUND-ADSORBED CATHODE ACTIVE MATERIAL AND LITHIUM BATTERY USING THE SAME

(75) Inventors: Young-min Choi, Gyeonggi-do (KR); Yong-nam Ham, Gyeonggi-do (KR); Jung-joon Park, Chungcheongnam-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 552 days.

(21) Appl. No.: 10/772,290

(22) Filed: Feb. 6, 2004

(65) Prior Publication Data

US 2004/0157127 A1    Aug. 12, 2004

(30) Foreign Application Priority Data

Feb. 7, 2003    (KR) ...................... 10-2003-0007759

(51) Int. Cl.
*H01M 4/58* (2006.01)
*H01M 2/00* (2006.01)
*H01M 4/00* (2006.01)
*H01M 4/50* (2006.01)

(52) U.S. Cl. ...................... 429/231.1; 429/61; 429/221; 429/223; 429/224; 429/231.3; 429/231.8

(58) Field of Classification Search ............. 429/231.1, 429/231.8, 61, 53, 223, 221, 224, 231.3
See application file for complete search history.

(56) References Cited

U.S. PATENT DOCUMENTS

| 5,427,875 A | 6/1995 | Yamamoto et al. ......... 429/233 |
| 5,707,756 A * | 1/1998 | Inoue et al. .................. 429/57 |
| 6,692,873 B1 * | 2/2004 | Park et al. ................... 429/247 |

FOREIGN PATENT DOCUMENTS

| JP | 10-302779 | * 11/1998 |
| JP | 2003-015115 | 1/2003 |
| KR | 2002-0053738 | 7/2002 |

* cited by examiner

*Primary Examiner*—Patrick Joseph Ryan
*Assistant Examiner*—Thomas H. Parsons
(74) *Attorney, Agent, or Firm*—Stein, McEwen & Bui, LLP

(57) ABSTRACT

A cathode active material is prepared by mixing a transition metal compound and a lithium compound in a molar ratio of 1:1.0-1:1.2 and thermally treating the mixture while supplying $CO_2$ and $O_2$ in a ratio of partial pressures ranging from 1:0.001-1:1,000, and a lithium battery utilizes the cathode active material. The lithium battery ensures safety against over-charging because an overflow of current may be effectively cut off without reducing discharging capacity and cycle life characteristics.

8 Claims, 4 Drawing Sheets

CARBON COMPOUND-ADSORBED CATHODE ACTIVE MATERIAL AND LITHIUM BATTERY USING THE SAME

CROSS-REFERENCE TO RELATED APPLICATIONS

This application claims the priority of Korean Patent Application No. 2003-7759, filed on Feb. 7, 2003, in the Korean Intellectual Property Office, the disclosure of which is incorporated herein in its entirety by reference.

BACKGROUND OF THE INVENTION

1. Field of the Invention

The present invention relates to a cathode active material comprising a carbon compound and a lithium battery using the same, and more particularly, to a cathode active material that provides a lithium battery with an improved discharging capacity and cycle life characteristics and ensures safety by contributing to cutting off the flow of a current when the battery is overcharged, and a lithium battery using the cathode active material.

2. Description of the Related Art

As portable electronic devices, such as camcorders, mobile phones, notebook computers, and the like, become smaller and more lightweight while at the same time becoming functionally more powerful, considerable research has been conducted into batteries as a driving source for these portable devices. In particular, rechargeable lithium secondary batteries have three times greater energy densities per unit weight and higher charging rates relative to conventional lead batteries, nickel-cadmium (Ni—Cd) batteries, nickel-hydrogen batteries, nickel-zinc batteries, and the like. For these reasons, lithium secondary batteries have received greater attention, and intensive research thereinto has been conducted.

Examples of cathode active materials that are widely used in lithium secondary batteries include lithium composite oxides, such as $LiCoO_2$, $LiNiO_2$, $LiMnO_2$, $LiMn_2O_4$, $LiFePO_4$, $LiNi_xCo_{1-x}O_2$, $LiNi_{1-x-y}Co_xMn_yO_2$, and the like. Examples of anode active materials that are commonly used include lithium metal, lithium metal alloys, carbonaceous materials, graphitic materials, and the like.

In addition, lithium secondary batteries include a separator to insulate a cathode and an anode, and an electrolyte acting as a lithium ion transfer medium. A carbonate-based organic solvent is widely used as the electrolyte.

Lithium secondary batteries include a cathode, an anode, a separator, and an electrolyte and are sealed with a container, such as a stainless steel can, an aluminum pouch, and the like. Accordingly, when a lithium secondary battery is overcharged due to the overflow of a current caused by abnormal operation, the electrolyte in the lithium secondary battery decomposes and forms gases, raising the internal pressure of the battery and breaking the container.

For this reason, a current cut-off device is incorporated into lithium secondary batteries. For example, the current cut-off device operates when the internal pressure of a battery rises excessively and separates a cathode tap from a cathode current collector to cut off the flow of current. However, this current cut-off device operates depending on the internal pressure of a battery, i.e., only when the internal pressure of a battery rises above a predetermined level. If there is no significant rise in internal pressure, the current cut-off device may not operate even when the temperature rises above a normal range.

To address this problem, U.S. Pat. No. 5,427,875 discloses the addition of 0.5-15% by weight of lithium carbonate ($Li_2CO_3$) in the manufacture of a cathode to allow a current cut-off device to operate in response to a rise in the internal temperature of a battery, wherein the lithium carbonate in the cathode generates a carbonic acid gas when the internal temperature of the battery rises, raising the internal pressure and initiating the operation of the current cut-off device. In Japanese Laid-open Patent No. 2003-151155, a cathode made of a mixture of a cathode active material containing 0.5% or less by weight of lithium carbonate and a cathode active material containing 0.5-5% by weight of lithium carbonate is utilized to allow a current cut-off device to operate more promptly in response to a rise in internal pressure and to improve a performance of the battery, such as discharging capacity and cycle life.

However, the above patents require an additional step of adding lithium carbonate to a cathode active material. In addition, it is difficult to obtain a uniform dispersion of lithium carbonate with the methods disclosed in the above patents.

SUMMARY OF THE INVENTION

The present invention provides a cathode active material that ensures safety measures against over-charging without reducing the discharging capacity and cycle life of a lithium battery.

The present invention provides a lithium battery using the cathode active material.

In one aspect, the present invention provides a cathode active material comprising a lithium transition metal composite oxide in which a carbon compound is adsorbed to give the lithium transition metal composite oxide a carbon content of 10-1,000 ppm.

In another aspect, the present invention provides a method of preparing the above cathode active material, the method comprising: mixing a transition metal compound and a lithium compound in a molar ratio of 1:1.0-1:1.2; and thermally treating the mixture while supplying $CO_2$ and $O_2$ in a ratio of partial pressures ranging from 1:0.001-1:1000.

In another aspect, the present invention provides a lithium battery comprising: a cathode that includes the above cathode active material; an anode that includes a carbonaceous material that allows lithium ions to be intercalated and deintercalated; a separator interposed between the cathode and the anode; an electrolytic solution that includes an electrolytic solute dissolved in a nonaqueous solvent; and a current cut-off device that operates in response to a rise in the internal pressure of the battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
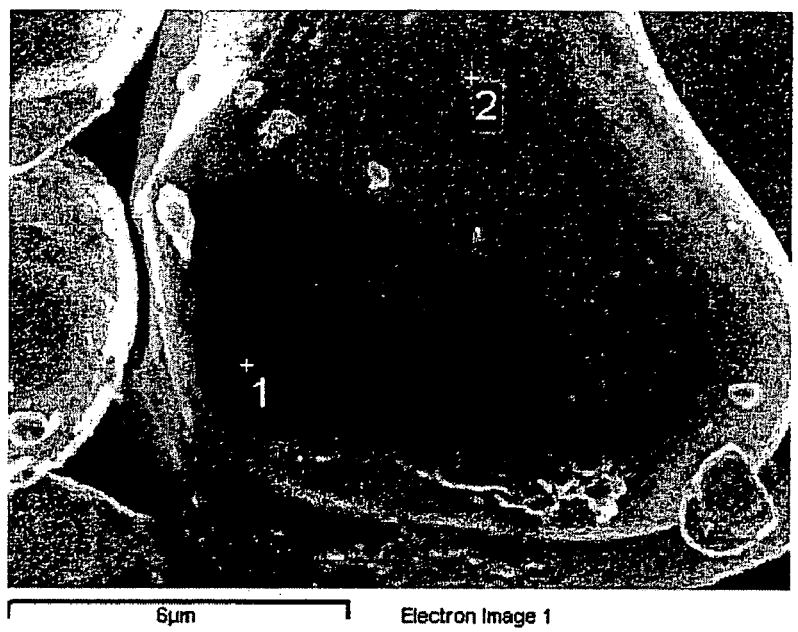
FIG. 1 is a scanning electron microscopic (SEM) micrograph (×12,000) of $LiCoO_2$ prepared in Example 1 according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A cathode active material, a method of preparing the same, and a lithium battery using the cathode active material according to an embodiment of the present invention will be described in detail.

A lithium battery according to an embodiment of the present invention includes a cathode manufactured using a cathode active material that comprises a lithium transition metal composite oxide in which a carbon compound is adsorbed to give the lithium transition metal composite oxide a carbon concentration of 10-1,000 ppm.

When the carbon compound-adsorbed lithium transition metal composite oxide is used as a cathode active material, a current cut-off device in a lithium battery may be timely operated due to a rise in internal pressure caused by the carbon compound in the cathode active material that forms gases when the internal temperature of the lithium battery rises due to an operational failure or over-charging. Therefore, the safety of the lithium battery is ensured.

The current cut-off device used in the present invention may cut off the flow of current by separating a cathode tab from a cathode current collector when the internal pressure of the battery rises.

As described above, to ensure safety, a lithium battery according to an embodiment of the present invention uses a cathode active material that is a lithium transition metal composite oxide in which a carbon compound is adsorbed to give the lithium transition metal composite oxide a carbon concentration of 10-1,000 ppm. If the amount of the carbon compound adsorbed results in a carbon concentration of less than 10 ppm, it is difficult to generate a gas sufficient to operate the current cut-off device inside the lithium battery. If the amount of the carbon compound adsorbed results in a carbon concentration of greater than 1,000 ppm, the cycle life characteristics of the battery deteriorate. The carbon compound may have a specific surface area of 10-5,000 $m^2/g$.

The carbon compound may be present in the surface of the lithium transition metal complex oxide in the form of either an oxide or a carbonate compound, such as CO, $CO_2$, $Li_2CO_3$, and the like. The carbon compound is derived from source materials used in the preparation of the lithium transition metal complex oxide, externally supplied $CO_2$ or $O_2$, or a reaction product thereof. Although the carbon compound is described as being adsorbed into the surface of the lithium transition metal complex oxide, it may be linked to the surface of the lithium transition metal complex oxide by a chemical bond such as a covalent bond. Therefore, the description "adsorption of the carbon compound into the surface of the lithium transition metal complex oxide" throughout the specification must not be interpreted as excluding a link to the lithium transition metal complex oxide by a chemical bond.

The lithium transition metal composite oxide to which a carbon compound is to be adsorbed may be at least one oxide selected from the group consisting of $LiNiO_2$, $LiCoO_2$, $LiMn_2O_4$, $LiFePO_4$, $LiNi_xCo_{1-x}O_2$ where $0<x<1$, and $LiNi_{1-x-y}Co_xMn_yO_2$ where $0<x<1$, $0<y<1$, and $0<x+y<1$.

A method of preparing a lithium transition metal composite oxide to which a carbon compound is adsorbed, according to an embodiment of the present invention, will now be described.

Figure 6:
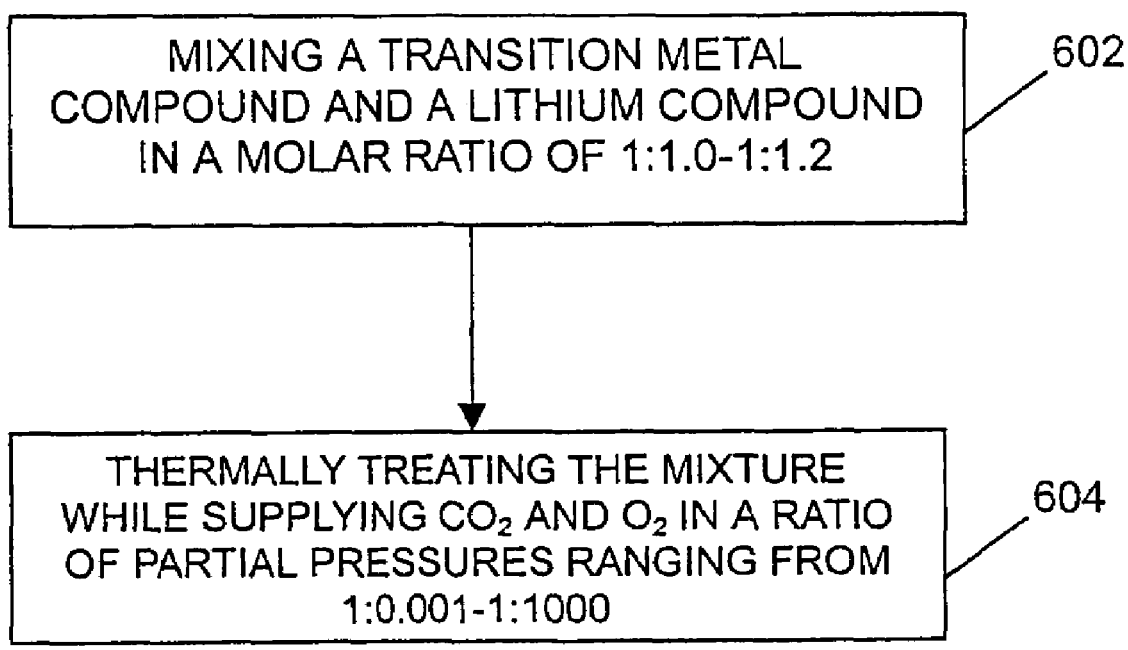
FIG. 6 is a flow chart showing operations in accordance with an embodiment of a method of the present invention.

As shown in FIG. 6, numeral 600, the method includes mixing a transition metal compound and a lithium compound in a molar ratio of 1:1.0-1:1.2 (602) and thermally treating the mixture while supplying $CO_2$ and $O_2$ in a ratio of partial pressures ranging from 1:0.001 to 1:1,000 (604). The temperature of the thermal treatment may be in the range of 600-1,000° C.

In the above method, the molar ratio of 1:1.0-1:1.2 between the transition metal compound and the lithium compound mixed is a preferred range. If the molar ratio of the transition metal compound and the lithium compound mixed does not lie within the above range, the characteristics of the battery, such as the life span and high-rate charging/discharging characteristics, deteriorate.

Any lithium compound that is commonly used in the preparation of a cathode active material of lithium batteries may be used without limitation. Specific examples of the lithium compound include lithium carbonate, lithium hydroxide, lithium nitrate, lithium sulfate, lithium acetate, lithium oxide, and the like.

Any transition metal compound that is commonly used in the preparation of a cathode active material of lithium batteries may be used without limitation. Specific examples of the transition metal compound include a transition metal carbonate, a transition metal hydroxide, a transition metal nitrate, a transition metal sulfate, a transition metal acetate, a transition metal oxide, and the like.

As described above, in preparing the lithium transition metal complex oxide to which a carbon compound is adsorbed, a ratio of partial pressures between $CO_2$ and $O_2$ that are supplied during the thermal treatment are required to be adjusted. $CO_2$ and $O_2$ may be supplied in a ratio of partial pressure ranging from 1:0.001 to 1:1,000, preferably, from 1:1 to 1:100, more preferably, from 1:1 to 1:10. If the ratio of partial pressures between $CO_2$ and $O_2$ does not lie within the above ranges, a desired crystalline structure cannot be obtained. The partial pressures of $CO_2$ and $O_2$ are measured immediately before they are injected into a reactor.

The gases may flow straight into the reactor. However, the gases may circulate in whirls to facilitate reaction. The formation of whirls in the gases may be achieved by inducing convection, for example, by using fans installed in the reactor.

The temperature of the thermal treatment is not limited to a particular range as long as a lithium transition metal complex oxide may be synthesized. However, a preferred temperature range for the thermal treatment is between 600° C. and 1,000° C.

The present invention also provides a lithium battery comprising: a cathode that includes the above cathode active material according to an embodiment of the present invention; an anode that includes a carbonaceous material that allows lithium ions to be intercalated and deintercalated; a separator interposed between the cathode and the anode; an electrolytic solution that includes an electrolytic solute dissolved in a nonaqueous solvent; and a current cut-off device that operates in response to a rise in the internal pressure of the battery.

Figure 5:
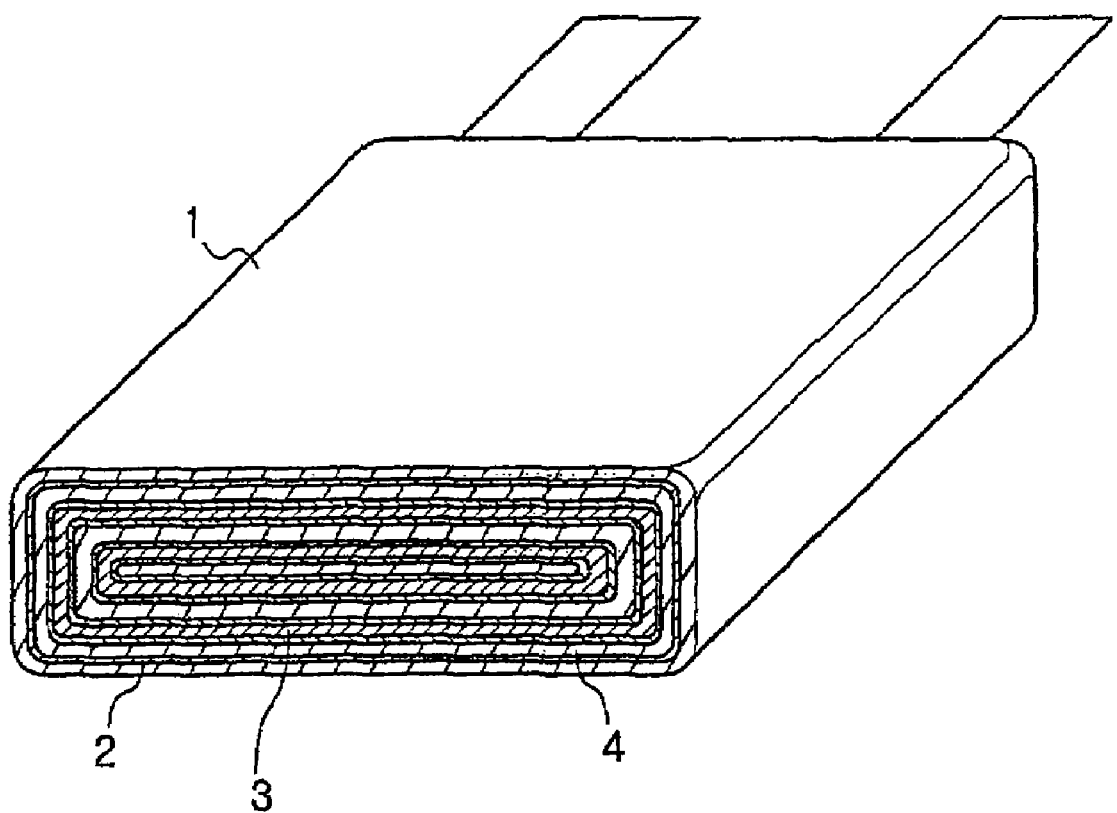
FIG. 5 is a perspective view showing a lithium battery in accordance with the present invention.

The structure of the lithium battery is also known to those skilled in the art. FIG. 5 shows an embodiment of the structure of the lithium secondary battery of the present invention. As shown in FIG. 5, a positive electrode 3, a negative electrode 4, and a separator 2 interposed between the positive electrode 3 and the negative electrode 4 are inserted into a battery case 1.

A method of manufacturing the lithium battery according to an embodiment of the present invention will now be described.

Initially, a cathode active material composition is prepared by mixing a cathode active material, a conducting agent, a binder, and a solvent. This cathode active material composition is directly coated on an aluminum current collector and dried to manufacture a cathode plate. Alternatively, the cathode plate may be manufactured by laminating an aluminum current collector with a cathode active material film that is previously formed by casting the cathode active material composition on a support, and then separated therefrom.

The cathode active material is a lithium transition metal composite oxide in which a carbon compound is adsorbed, wherein the lithium transition metal composite oxide is at least one selected from the group consisting of $LiNiO_2$, $LiCoO_2$, $LiMn_2O_4$, $LiFePO_4$, $LiNi_xCo_{1-x}O_2$ where $0<x<1$, and $LiNi_{1-x-y}Co_xMn_yO_2$ where $0<x<1$, $0<y<1$, and $0<x+y<1$. Examples of the conducting agent include, but are not limited to, carbon black, acetylene black, Ketjen black, and the like. Examples of the binding agent include, but are not limited to, vinylidenefluoride-hexafluoropropylene copolymer, polyvinylidenefluoride, polyacrylonitrile, polymethylmethacrylate, polytetrafluoroethylene, a mixture thereof, and styrene-butadiene copolymer rubbers. Examples of the solvent used in the preparation of the cathode active material composition include, but are not limited to, N-methylpyrrolidone (NMP), acetone, water, and the like. The amounts of active cathode material, conducting agent, binding agent, and solvent in the cathode active material composition utilized are in accordance with conventional levels for lithium batteries.

In a similar manner applied to manufacture the cathode plate, an anode active material composition is prepared by mixing an anode active material, a conducting agent, a solvent, and optionally, a binding agent. A copper current collector is directly coated with the anode active material composition or is laminated with an anode active material film that is previously formed by casting the anode active material composition on a support and then separated therefrom, to manufacture an anode plate. Lithium metal, a lithium alloy, a carbonaceous material, or graphite may be used as the anode active material. In addition, the above-listed examples of a conducting agent, a binding agent, and a solvent for the cathode active material composition may be used for the anode active material composition. In a certain case, a plasticizing agent may be further added into each of the cathode and anode active material compositions to form porous cathode and anode plates.

Meanwhile, any separator commonly used in the manufacture of lithium batteries may be used for a lithium battery according to an embodiment of the present invention. However, preferred materials for the separator allow electrolyte ions to migrate with less resistance and have the ability to retain a larger amount of electrolytic solution. Specific examples of such separator materials include a glass fiber, polyester, polyehtylene, polypropylene, polytetrafluoroethylene (PTFE), such as, for example, TEFLON, and a combination of the foregoing materials, which may be in nonwoven fabric or woven fabric form. In particular, a separator made of polyethylene, polypropylene, or the like, which can be rolled, may be used for a lithium ion battery, and a separator that may retain a larger amount of organic electrolytic solution may be used for a lithium ion polymer battery. These separators may be manufactured as follows.

First, a separator composition is prepared by mixing a polymer resin, a filling agent, and a solvent. This separator composition is directly coated on an electrode and dried to form a separator. Alternatively, the separator may be formed by laminating the electrode with a separator film, which is previously formed by casting the separator composition on a support and drying.

Any polymer resin that may be used as a binding agent for electrode plates may be used without limitations. Examples of the polymer resin include a vinylidenefluoride-hexafluoropropylene copolymer, polyvinylidenefluoride, polyacrylonitrile, polymethacrylate, and a mixture of the forgoing materials. A preferred polymer resin is a vinylidenefluoride-hexafluoropropylene copolymer having 8-25% by weight of hexafluoropropylene.

The separator is disposed between the cathode plate and anode plate manufactured as described above to form an electrode assembly. In one embodiment, this electrode assembly is rolled or folded, and then sealed in a cylindrical or rectangular battery case, followed by the injection of a nonaqueous electrolytic solution into the battery case to manufacture a complete lithium battery. Alternatively, electrode assemblies may be stacked upon one another to form a bicell structure, soaked in a nonaqueous electrolytic solution, and sealed in a pouch to manufacture a complete lithium battery.

The nonaqueous electrolytic solution may be a solution of 0.5-3.0 moles per liter of a lithium salt in an organic solvent. Examples of the lithium salt include, but are not limited to, $LiPF_6$, $LiClO_4$, $LiBF_4$, $LiBF_6$, $LiCF_3SO_3$, $LiAsF_6$, $LiC_4F_9SO_3$, $LiN(SO_2CF_3)_2$, $LiN(SO_2C_2F_5)_2$, and a mixture of the forgoing salts.

Examples of the organic solvent include, but are not limited to, ethylene carbonate, propylene carbonate, dimethyl carbonate, methyl ethyl carbonate, diethyl carbonate, methyl propyl carbonate, ethyl propyl carbonate, methyl butyl carbonate, tetrahydrofuran, 2-methyltetrahydrofuran, diethoxy ethane, methyl formate, ethyl formate, triglyme, tetraglyme, fluorobenzene, difluorobenzene, γ-butyrolactone, and a mixture of the foregoing solvents.

The present invention will be described in greater detail with reference to the following examples. The following examples are for illustrative purposes and are not intended to limit the scope of the invention.

Manufacture of Lithium Batteries

96% by weight of $LiCoO_2$, 2% by weight of polyvinylidenefluoride (PVDF) as a binder, and 2% by weight of a carbonaceous conducting agent that facilitates migration of electrons were mixed together, and 100 mL of N-methylpyrrolidone (NMP) and ceramic balls were added to the mixture and thoroughly mixed in a 200-mL plastic bottle for about 10 hours. A cathode was cast from the mixture on a 15 μm-thick aluminium foil using a 250 μm-spaced doctor blade, dried in an oven at 110° C. for about 12 hours to fully evaporate the NMP, roll pressed, and cut to a predetermined size to manufacture a cathode plate having a thickness of 95 μm.

96% by weight of graphite powder as an anode active material, 4% by weight of PVDF as a binder, and NMP were mixed together, and ceramic balls were added into the mixture and thoroughly mixed for about 10 hours. An anode was cast from the mixture on a 19 μm-thick copper foil using a 300 μm-spaced doctor blade, dried in an oven at 90° C. for about 10 hours to fully evaporate the NMP, roll pressed, and cut to a predetermined size to manufacture an anode plate having a thickness of 120 μm.

A micro-porous, 20 μm-thick polyethylene-polypropylene membrane (available from CELANESE AG, U.S.A.) was used as a separator.

The separator was interposed between the cathode plate and the anode plate manufactured using the above processes and rolled into a jelly-roll electrode assembly. The electrode assembly was placed in a cylindrical aluminium battery case, followed by the injection of a nonaqueous electrolytic solution and sealing to form a 1800-mAh lithium secondary battery.

The nonaqueous electrolytic solution was prepared by dissolving 1.1 M of $LiPF_6$ in 5.3 g of an organic solvent mixture of ethylene carbonate (EC), ethyl methyl carbonate (EMC), propylene carbonate (PC), and fluorobenzne (FB) in a ratio of 30:55:5:10 by volume.

A plurality of lithium batteries were manufactured using various cathode active materials ($LiCoO_2$) prepared in the following examples and comparative examples.

EXAMPLE 1

Lithium carbonate and cobalt carbonate were mixed in a molar ratio of 1.05:1 and thermally treated at 950° C. while supplying $CO_2$ and $O_2$ in a 1:1 ratio of partial pressures to obtain $LiCoO_2$ for use as a cathode active material.

FIG. 1 is a scanning electron microscopic (SEM) micrograph (×12,000) of the cathode active material $LiCoO_2$. In FIG. 1, a darker region indicated by "1" is a region of the surfaces of $LiCoO_2$ particles in which a carbon compound is adsorbed, and a brighter region indicated by "2" is a region of the surface of $LiCoO_2$ particles in which no carbon compound is adsorbed.

As a result of energy dispersive spectrometry carried out using the $LiCoO_2$ particles, carbon is detected in the darker region 1, whereas nearly no carbon is detected in the brighter region 2. It is apparent from the foregoing that the carbon compound is adsorbed into parts of the surfaces of the $LiCoO_2$ particles. The same results are observed from $LiCoO_2$ particles prepared in Examples 1 through 4.

The $LiCoO_2$ particles were utilized in the manufacture of a lithium secondary battery by the above-described method.

EXAMPLE 2

Lithium carbonate and cobalt carbonate were mixed in a molar ratio of 1.02:1 and thermally treated at 950° C. while supplying $CO_2$ and $O_2$ in a 1:2 ratio of partial pressures to obtain $LiCoO_2$ for use as a cathode active material. The resulting $LiCoO_2$ was utilized in the manufacture of a lithium secondary battery by the above-described method.

EXAMPLE 3

Lithium hydroxide and cobalt carbonate were mixed in a molar ratio of 1.01:1 and thermally treated at 900° C. while supplying $CO_2$ and $O_2$ in a 1:1 ratio of partial pressures to obtain $LiCoO_2$ for use as a cathode active material. The resulting $LiCoO_2$ was utilized in the manufacture of a lithium secondary battery by the above-described method.

EXAMPLE 4

Lithium carbonate and cobalt carbonate were mixed in a molar ratio of 1.03:1 and thermally treated at 950° C. while supplying $CO_2$ and $O_2$ in a 1:1 ratio of partial pressures to obtain $LiCoO_2$ for use as a cathode active material. The resulting $LiCoO_2$ was utilized in the manufacture of a 1800-mAh cylindrical lithium secondary battery by the above-described method.

Figure 3:
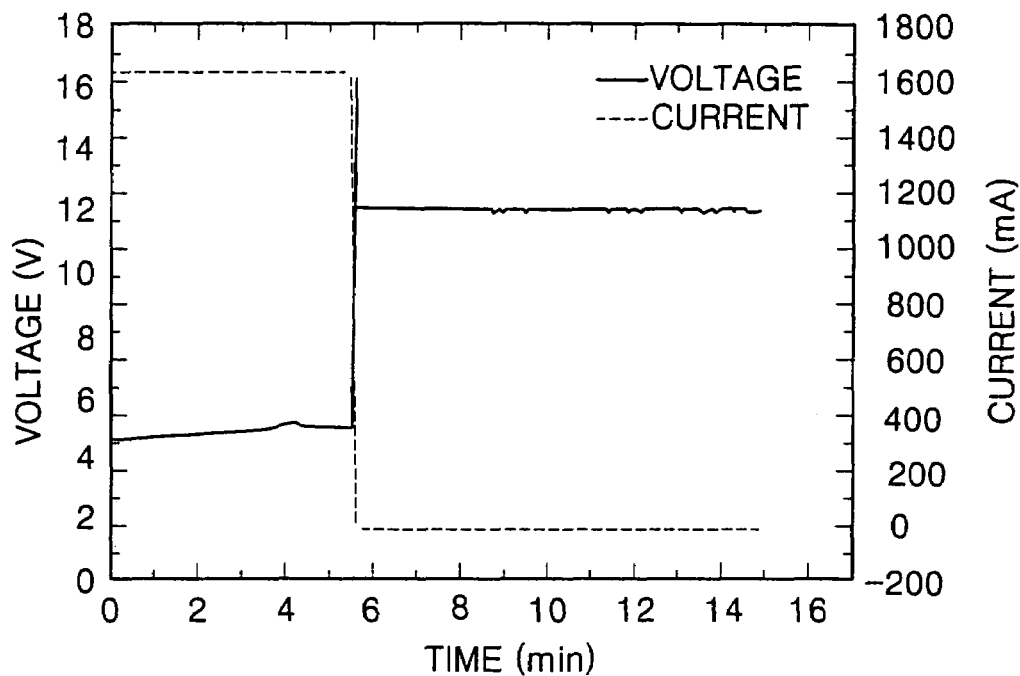
FIG. 3 is a graph illustrating the over-charging characteristics of a 1800-mAh cylindrical lithium secondary battery manufactured in Example 4 according to the present invention.

FIG. 3 is a graph illustrating the over-charging characteristics of the 1800-mAh cylindrical lithium secondary battery manufactured in Example 4. An over-charging test was carried out by charging the lithium secondary battery with a current of 900 mA to a voltage of 4.2 V and charging it further for 2.5 hours at a constant voltage of 4.2 V. After charging at a constant current/constant voltage with a charging current of 1C (1800 mA), 12 V for 2.5 hours, the voltage and current levels and appearance of the lithium secondary batteries were evaluated. As is apparent from FIG. 3, after reaching 12 V, no more current flows by the operation of a current cut-off device in response to a rise in the internal pressure of the battery.

COMPARATIVE EXAMPLE 1

Lithium hydroxide and cobalt carbonate were mixed in a molar ratio of 1:1 and thermally treated at 900° C. in an $O_2$ atmosphere to obtain $LiCoO_2$ for use as a cathode active material. The resulting $LiCoO_2$ was utilized in the manufacture of a 1800-mAh cylindrical lithium secondary battery by the above-described method. An over-charging test was carried out using the lithium secondary battery in the same conditions as in Example 4.

Figure 4:
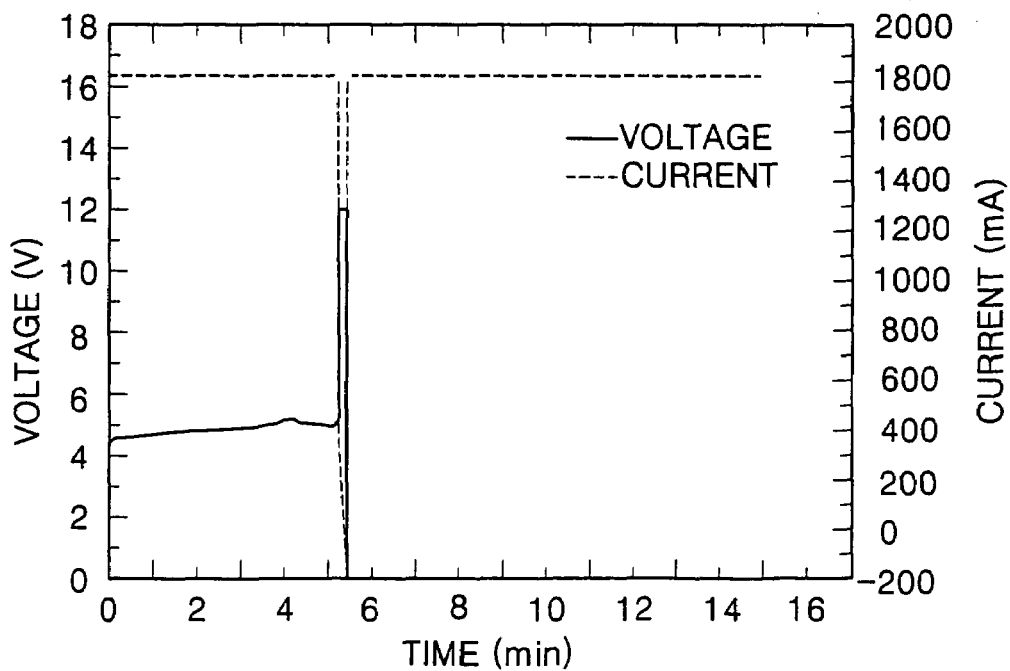
FIG. 4 is a graph illustrating the over-charging characteristics of a 1800-mAh cylindrical lithium secondary battery manufactured in Comparative Example 1.

FIG. 4 is a graph illustrating the over-charging characteristics of the lithium secondary battery manufactured in Comparative Example 1. As is apparent from FIG. 4, a current continues to flow even after the voltage of the battery reaches 12 V because a current cut-off device in the battery does not operate.

COMPARATIVE EXAMPLE 2

Lithium carbonate and cobalt carbonate were mixed in a molar ratio of 1.3:1 and thermally treated at 950° C. while supplying $CO_2$ and $O_2$ in a 1:1 ratio of partial pressures to obtain $LiCoO_2$ for use as a cathode active material. The resulting $LiCoO_2$ was utilized in the manufacture of a 1800-mAh cylindrical lithium secondary battery by the above-described method.

TABLE 1

| Example | Carbon content (ppm) |
|---|---|
| Example 1 | 420 |
| Example 2 | 319 |
| Example 3 | 341 |
| Example 4 | 398 |
| Comparative Example 1 | 8 |
| Comparative Example 2 | 1162 |

Table 1 above shows the results of a test performed on the $LiCoO_2$ particles prepared in Examples 1 through 4 and Comparative Examples 1 and 2 using a thermal analyzer (Model CS-444, LECO CO.) to quantify carbon. As shown in Table 1, the carbon content may be varied by adjusting the ratio of partial pressures between $CO_2$ and $O_2$ regardless of the kind of the lithium compound used. The lithium battery of Comparative Example 1 includes an insufficient amount of carbon to provide the effects that are achieved by the present invention. The lithium battery of Comparative Example 2 includes excess carbon and has reduced cycle life characteristics.

Figure 2:
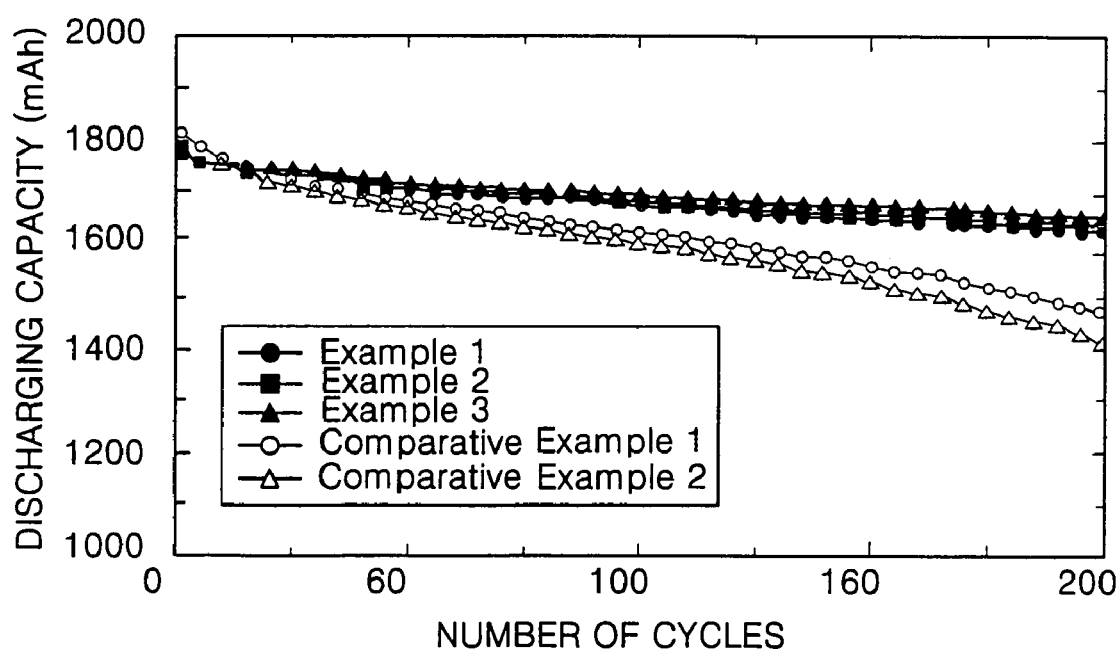
FIG. 2 is a graph of discharging capacity for examples of lithium secondary batteries manufactured using a cathode active material according to the present invention.

FIG. 2 is a graph of discharging capacity for the lithium secondary batteries manufactured in Examples 1 through 3 and Comparative Examples 1 and 2. FIG. 2 shows changes in the discharging capacity of the lithium secondary batteries after 200 charging/discharging cycles at 1 C rate with a nominal capacity (C) of 1800 mAh. The lithium secondary batteries of Examples 1 through 3 according to the present invention retain discharge capacities of 1620 mAh or more, which are greater than the lithium secondary batteries of Comparative Examples 1 and 2, and have more effective cycle life characteristics.

The results of FIG. 2 are tabulated in Table 2. In Table 2, in addition to the discharging capacities of the lithium secondary batteries manufactured in Examples 1 through 3 and Comparative Examples 1 and 2 after 200 charging/discharging cycles at 1 C rate with a nominal capacity (C) of 1800 mAh, discharging capacity retention percentages with respect to nominal capacity are shown.

TABLE 2

| Example | Discharging Capacity after 200 Cycles | Discharging Capacity Retention after 200 Cycles (% with respect to a nominal capacity of 1800 mAh) |
| --- | --- | --- |
| Example 1 | 1620 mAh | 90.0% |
| Example 2 | 1630 mAh | 90.6% |
| Example 3 | 1648 mAh | 91.6% |
| Comparative Example 1 | 1471 mAh | 81.7% |
| Comparative Example 2 | 1409 mAh | 78.3% |

As shown in Table 2, the lithium secondary batteries manufactured in Examples 1 through 3 according to the present invention retain, after 200 cycles of charging/discharging, 90.0%, 90.6%, and 91.6% of the nominal capacity, respectively, providing effective cycle life characteristics compared to the lithium secondary batteries of Comparative Examples 1 and 2 that had charge retentions of 81.7% and 78.3%, respectively. It is apparent from the results that cycle life characteristics are reduced when a cathode active material used contains less than 10 ppm or more than 1,000 ppm of carbon that is added in compound form and adsorbed into the surface of the carbon active material.

As described above, a cathode active material according to an embodiment of the present invention contains a carbon compound that is adsorbed into the surface thereof, wherein the distribution and content of carbon in the carbon active material may be controlled easily by varying the ratio of partial pressures of $CO_2$ and $O_2$ supplied during the manufacturing process of a cathode active material. In addition, there is no post process of mixing with the carbon compound, thus simplifying the overall manufacturing process and reducing the manufacturing cost.

When a lithium secondary battery is manufactured according to an embodiment of the present invention using a cathode plate that includes the above carbon-adsorbed cathode active material, safety against over-charging is ensured without reducing the discharging capacity and cycle life characteristics of the battery. This is attributed to the carbon compound added to the cathode active material, which decomposes and forms gases when the battery is overcharged and the internal pressure of the battery is raised, to operate a current cut-off device in a timely fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode active material comprising:
   a lithium transition metal composite oxide in which a carbon compound is adsorbed to obtain a carbon content of 10-1,000 ppm.

2. The cathode active material of claim 1, wherein the lithium transition metal composite oxide is at least one selected from the group consisting of $LiNiO_2$, $LiCoO_2$, $LiMn_2O_4$, $LiFePO_4$, $LiNi_xCo_{1-x}O_2$ where $0<x<1$, and $LiNi_{1-x-y}Co_xMn_yO_2$ where $0<x<1$, $0<y<1$, and $0<x+y<1$.

3. The cathode active material of claim 1, wherein the carbon compound has a specific surface area of 10-5,000 $m^2/g$.

4. A lithium battery comprising:
   a cathode comprising:
      a cathode active material that comprises a lithium transition metal composite oxide in which a carbon compound is adsorbed to obtain a carbon content of 10-1,000 ppm;
   an anode comprising a carbonaceous material to facilitate intercalating and deintercalating lithium ions;
   a separator interposed between the cathode and the anode;
   an electrolytic solution containing an electrolytic solute dissolved in a nonaqueous solvent; and
   a current cut-off device that operates in response to a rise in an internal pressure of the lithium battery.

5. The lithium battery of claim 4, wherein the carbon compound has a specific surface area of 10-5,000 $m^2/g$.

6. The lithium battery of claim 4, wherein the separator is selected from the group consisting of a glass fiber, polyester, polyethylene, polypropylene, polytetrafluoroethylene, and a combination of thereof.

7. A lithium battery comprising:
   a cathode comprising:
      a cathode active material that comprises a lithium transition metal composite oxide in which a carbon compound is adsorbed to obtain a carbon content of 10-1,000 ppm and wherein the lithium transition metal composite oxide is at least one selected from the group consisting of $LiNiO_2$, $LiCoO_2$, $LiMn_2O_4$, $LiFePO_4$, $LiNi_xCo_{1-x}O_2$ where $0<x<1$, and $LiNi_{1-x-y}Co_xMn_yO_2$ where $0<x<1$, $0<y<1$, and $0<x+y<1$;
   an anode comprising a carbonaceous material to facilitate intercalating and deintercalating lithium ions;
   a separator interposed between the cathode and the anode;
   an electrolytic solution containing an electrolytic solute dissolved in a nonaqueous solvent; and
   a current cut-off device that operates in response to a rise in an internal pressure of the lithium battery.

8. The lithium battery of claim 7, wherein a polymer resin is utilized as a binding agent for the anode and the cathode, and wherein the polymer resin is a vinylidenefluoride-hexafluoropropylene copolymer having 8-25% by weight of hexafluoropropylene.

* * * * *